United States Patent [19]

Lepperhoff et al.

[11] Patent Number: 4,872,889

[45] Date of Patent: Oct. 10, 1989

[54] FILTER SYSTEM FOR THE REMOVAL OF ENGINE EMISSION PARTICULATES

[75] Inventors: Gerhard Lepperhoff, Eschweiler; Georg Hüthwohl, Aachen, both of Fed. Rep. of Germany

[73] Assignee: FEV Motorentechnik GmbH & Co., KG, Aachen, Fed. Rep. of Germany

[21] Appl. No.: 179,647

[22] Filed: Apr. 8, 1988

[30] Foreign Application Priority Data

Apr. 11, 1987 [DE] Fed. Rep. of Germany ....... 3712333

[51] Int. Cl.⁴ ............................................ B01D 46/00

[52] U.S. Cl. ........................................ 55/267; 55/282; 55/466; 55/523; 60/303; 60/311

[58] Field of Search ................. 55/267, 282, 466, 523; 60/311, 303

[56] References Cited

U.S. PATENT DOCUMENTS

| | | | |
|---|---|---|---|
| 4,276,066 | 6/1981 | Bly | 55/287 |
| 4,299,600 | 11/1981 | Kobashi | 55/213 |
| 4,373,330 | 2/1983 | Stark | 55/DIG. 30 |
| 4,427,418 | 1/1984 | Kogiso | 55/287 |
| 4,505,107 | 3/1985 | Yamaguchi | 60/303 |
| 4,512,786 | 4/1985 | Sakurai et al. | 55/523 |
| 4,519,820 | 5/1985 | Oyobe et al. | 55/466 |
| 4,548,625 | 10/1985 | Ishida et al. | 55/282 |

*Primary Examiner*—Bernard Nozick

*Attorney, Agent, or Firm*—Watson, Cole, Grindle & Watson

[57] ABSTRACT

A filter system for removing particulates from exhaust gases of an internal combustion engine, in particular a diesel engine, having at least one filter member formed by filter channels in the configuration of a honeycomb and made of a porous filter material, in which the region of the inlet openings of the filter channels open on the gas intake side, electrical resistance looped heating elements are arranged that are connected via a lead-in and a lead-out to a power supply. A secure positioning of the heating loops in the honeycomb is assured and contact errors are avoided. The loops of the resistance heating elements and/or the loop connections are received in grooves of the filter system in such a manner that they retain their pre-determined position despite vibrations, thermally-induced shape changes and the like. The grooves can be located in the filter member and/or in a cover plate overlying the inlet face of the filter member.

14 Claims, 7 Drawing Sheets

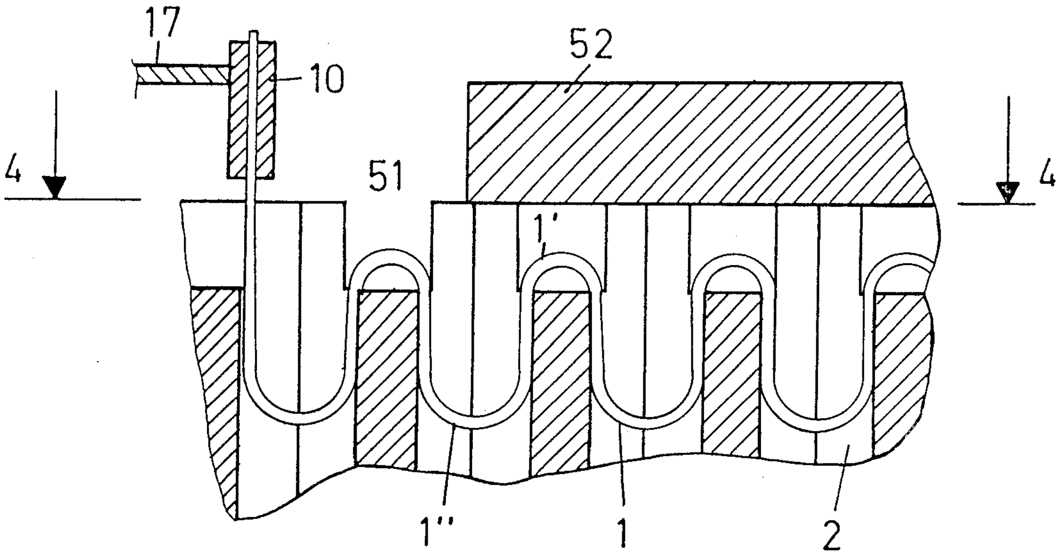
Fig. 3
Fig. 4
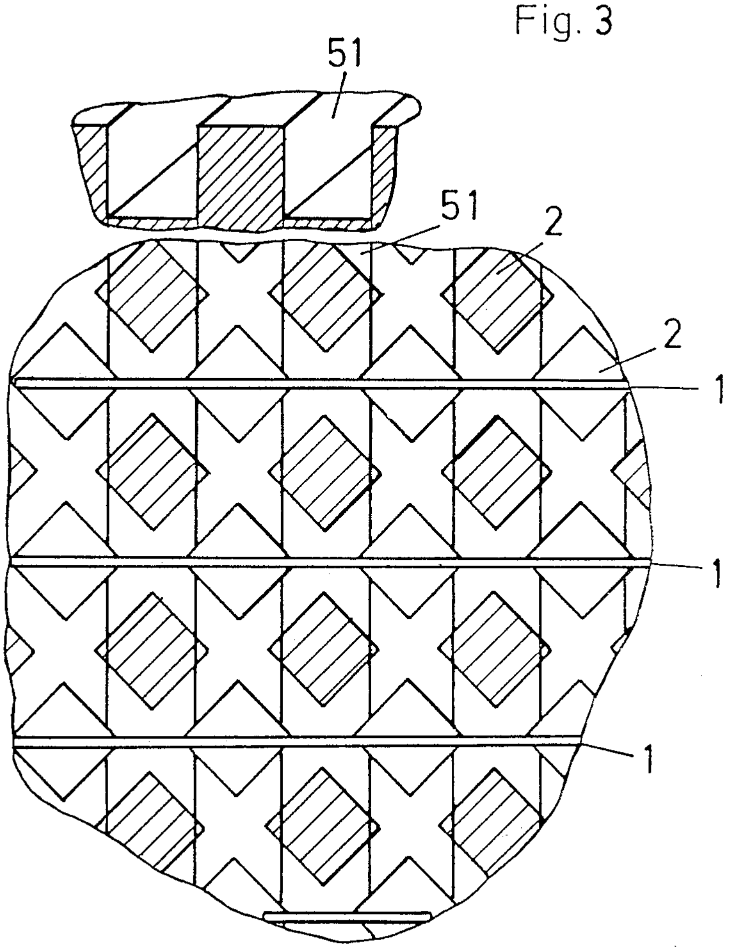

Fig. 7
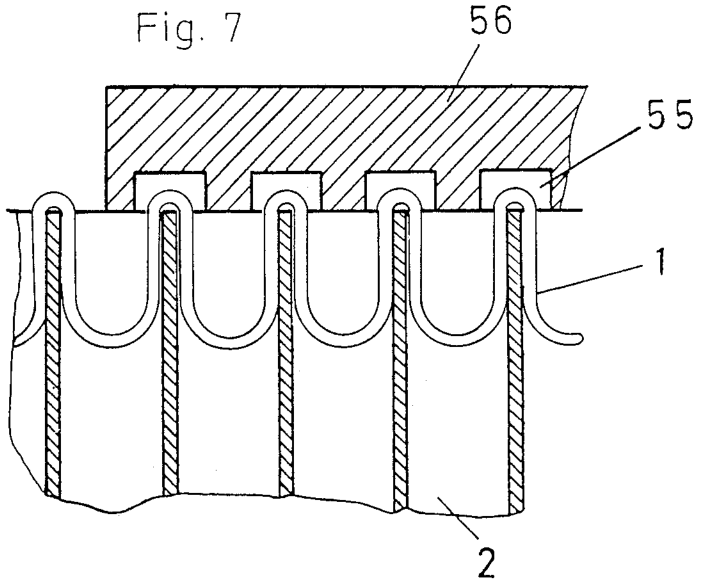
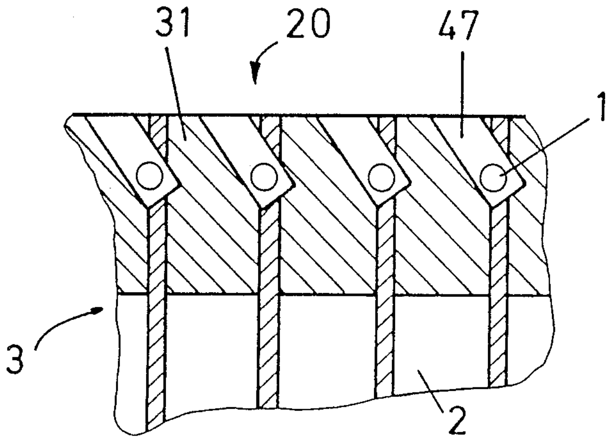
Fig. 8
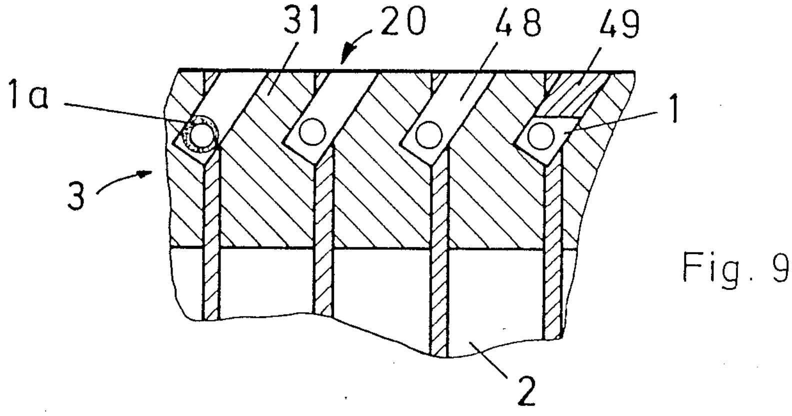
Fig. 9

FILTER SYSTEM FOR THE REMOVAL OF ENGINE EMISSION PARTICULATES

BACKGROUND OF THE INVENTION

This invention relates to a filter system for removing particulates from the exhaust gases of an internal combustion engine, in particular a diesel engine, having at least one filter member formed by honeycomb filter channels and made of a porous filter material, whereby electrical resistance heating elements, which are connected via a lead-in and a lead-out to a power supply are mounted in the region of the intake opening of the filter channels, open on the gas intake side.

In order to reduce the emission of particulates, particularly in diesel engines, various types of exhaust after treatment systems are known. Usually they comprise filter systems which retain and collect the particulates in the exhaust gas. The particulates, retained in the filter, may lead to an increase in the flow resistance in the exhaust system so that the exhaust back pressure of the engine increases. This in turn leads to an increase in fuel consumption and in extreme cases to engine failure. Therefore, it is necessary to remove the particulates deposited in the filter, for example, by means of oxidation at high temperatures.

Honeycomb filters of a porous ceramic material have proven themselves to be suitable as a filter member for retaining the soot particles. These honeycomb filters are formed by a plurality of parallel filter channels, which are closed alternately on the gas inlet side and the gas discharge side so that the exhaust gases must flow through the porous filter walls and thus the particulates are deposited on the walls of the filter channels. The filter can be regenerated by incinerating the accumulated particulates.

The temperatures required to ignite the soot particles are not attained sufficiently often so that regeneration is not assured. Automatic regeneration can be attained by a supply of additional energy. An energy-efficient regeneration can be attained if in the inlet region of the filter channels the particulates, deposited in the filter member, are ignited punctually by means of a short-term supply of energy. The energy that is then released by the initial incineration of the particulates can then lead to a self-supporting incineration of the soot in the filter member. The layer of particulates can be ignited by means of looped resistance wires positioned in the opening of the filter channels. In order to facilitate complete regeneration, a loop of the conductor must be inserted into as many filter channels of the honeycomb filter as possible. The number of filter channels, which can be provided then with loops, is limited by the electrical resistance of the conductor.

With a 12 V supply voltage, which is common in vehicles, the length of the conductor ranges from 15 to 25 cm, of which 10 to 15 loops can be bent. Ceramic honeycomb filters have approximately 1,000 channels, which have to be heated. In order to heat the filter as completely as possible, a large number of individual heating wires bent in the shape of loops are inserted parallel and connected. In order to regenerate the entire filter simultaneously, a large quantity of heat is required, which cannot be supplied by the electrical wiring system of the vehicle. Thus the quantity of heat can be supplied only by sequential regeneration of individual subregions of the filter. An example of this is known from U.S. Pat. No. 4,427,418.

The loop-shaped bent conductors must be interconnected into small groups to facilitate carrying out sequential regeneration. The individual groups are electrically separated from one another and connected to the supply voltage of the vehicle in such a manner that they can be switched on independently of one another. The distance between the individual connections, which must be electrically insulated from one another, is very small due to the small cross-section of the channel of approximately 2×2 mm. Any contact between the individual connections would result in a short-circuit while the vehicle is operating, or several areas would be energized with a power consumption that is too high for the electrical system of the vehicle. If wires migrate, it can also result in a bridging of individual loops. The result is that the electrical resistance of the conductors drops, whereby the temperature of the conductors rises and the wires can burn through.

SUMMARY OF THE INVENTION

The object of the invention is to provide a regeneration system for diesel engine particulate filters of the above described type in which a firm positioning of the heating loops in the honeycomb member is assured and short-circuits are avoided.

According to one embodiment of the invention, a filter system of the aforedescribed type is provided such that the resistance heating elements and/or their connections are located in grooves of the filter member in such a manner that during vibrations, or thermally-induced shape changes and the like, they retain their pre-determined position. It may therefore be expedient to attach the assigned, loop-shaped electrical resistance heating elements, which extend into the filter channels, to several inlet openings in the area of the inlet openings of the filter channels, and to position the electrical connections of the loops of the heating elements in grooves between the individual channels. Preferably the connections of the resistance heating elements are firmly housed in the grooves, whereas the resistance heating elements are free to move.

Another preferred embodiment provides that the grooves are formed in the face of the filter member such that they slope alternately in opposite directions so that the resistance heating elements can be hooked into place. Also at least one portion of the grooves can be sealed at the top in the filter channels following the insertion of the resistance heating elements; and there is the advantage that prior to sealing, the resistance heating elements may be enclosed with a material that incinerates or vaporizes when the resistance heating element is heated so that no short-circuit connection occurs between the resistance heating elements and the filter.

Moreover, a gas-permeable cover plate may be provided in the direction of flow of the exhaust gas downstream from the resistance heating elements. Preferably the cover plate is of a material having negligible thermal conductivity, and can be of a grid structure which forms the flow channels; otherwise it can be of a porous ceramic foam.

The resistance heating elements and/or their connections can be housed in grooves of the filter member made of porous filter material; however, they can be alternatively housed in grooves of the cover plate or at the same time attached in grooves not only of the filter member but also of the cover plate.

Furthermore, the resistance heating elements and/or their connections extend across the end plugs of several filter outlet channels, and the resistance heating elements and/or their connections can be arranged on the inlet side of the filter member in a square-wave bent shape, and can have a rectangular cross-section.

For a filter system having heating elements attached to the face of the filter member, in particular, having heating elements, defining the individual heating areas, another embodiment of the invention provides that the free ends of the conductor are connected by means of a connecting element to a lead-out or lead-in, extending across the inlet face. Such an embodiment has the advantage that the lead-ins or lead-outs, comprising several heating wires, extending parallel to one another and travelling transverse thereto in the end region of the filter, form a stable heating element, which facilitates a reliable positioning of the heating wires, even if the filter system, as for example in a vehicle, is subjected to vibrations.

An especially suitable embodiment of the invention provides that the connecting element be made of an electric conducting material by means of a tube extending parallel to the direction of flow against the face of the filter member; one end of the tube being connected permanently to the lead-in or lead-out and the other end permanently connected to the free end of the heating wire. Thus is possible to provide a relatively rigid component, comprising lead-in or lead-out and connecting element. The component can be attached directly to the face of the filter member and thus the result is an improved positioning of the portion of loop-shaped heating wire in the filter channels. Thus with the rigid connector structured in such manner, the conductors of various areas that are very close together can be connected without the risk of a short-circuit due to bending of the connector during heating.

The connection between the connector and the tube guided against the face of the filter can be connected by forcing the conductor into place. A high thermal load at the holding point, which is mechanically stressed due to oscillation, during production, which can occur during welding of the conductor, is thus avoided. It is also possible to solder from the top of the filter.

In order to prevent with certainty the heating loops between the connecting points from migrating, the loops between the rigid connectors are also at least evenly spaced. Due to the different coefficients of heat expansion of the conductor material and the ceramic filter, a permanent connection, such as for example by gluing the conductor with ceramic glues, is not possible. The conductor should also not be permanently clamped into place, since this could eventually result in a material abrasion of the conductor. Also a permanent connection between conductor and filter material results in poor heat transfer this point, whereby the wire would be locally overheated.

Thus one configuration of the invention provides that the conductors on the filter face be guided at least to one part through openings, which are closed at the top. These openings are formed in such a manner that the conductor is movable therein with some free-play so that a force-induced mechanical stress, is largely avoided. The heat transfer to the environment is not restricted by the insulating effect of the ceramic so that the temperature of the conductor does not increase in the opening.

The openings can be formed by grooves, in which the conductors are positioned and which are located in the face of the filter in the course of direction of or perpendicular to the heating loops.

If in the course direction of the conductor, several short grooves are sloped at an angle in the face of the filter, the grooves in the finished product are largely closed at the top. Any possibility of migrating sideways is prevented by the grooves that slope in the opposite direction. When the groove is positioned vertically, it can be closed at the top after the installation of the conductor. This can be done by the gas-permeable cover plate, attached to the face of the filter. In the area where the ends of the conductor are connected, the cover plate is drilled through. Therefore, it is also possible to close at the top only one portion of the length of the groove, in the case of grooves in the direction of the conductor or a portion of the grooves transverse to the direction of the conductor approximately in the middle between the connecting ends. Then it is sufficient to fix some paths comprising gas-permeable plates transverse to the direction of travel of the conductors on the face of the filter e.g. by permanently glueing to the plug of the honeycomb filter. And it is Possible to guide some thin paths made of ceramic gas-impermeable material, e.g. thin tubes, which do not actually close the filter channels with their cross-section, transverse to the conductors direction of travel to the plug of the honeycomb structure, so that the grooves in turn are partially closed.

In an unfinished filter face, this construction of the openings can, however, also be produced by grooves, positioned corresponding in the cover plate or in the paths.

BRIEF DESCRIPTION OF THE DRAWINGS

FIG. 3 is a longitudinal cross-sectional view of a filter system similar to FIG. 1 but with grooves in the face of the filter member transverse to the course of direction of the conductor and including a porous cover plate;

FIG. 4 is a fragmentary plan view of the filter member of the embodiment according to FIG. 3;

FIG. 4A is a perspective view, partly in section, showing the grooves of FIGS. 3 and 4;

FIG. 7 is a longitudinal cross-sectional view of a further embodiment of part of a filter system with a porous cover plate on the face of the filter member and grooves in the cover plate;

FIG. 8 is a longitudinal cross-sectional view of a still further embodiment of part of a filter system with grooves sloped alternately in the opposite direction;

FIG. 9 is another longitudinal cross-sectional view of a filter system with grooves sloped alternately in the opposite direction, corresponding to FIG. 8, whereby the view is transversely displaced;

DETAILED DESCRIPTION OF THE DRAWINGS

Figure 1:
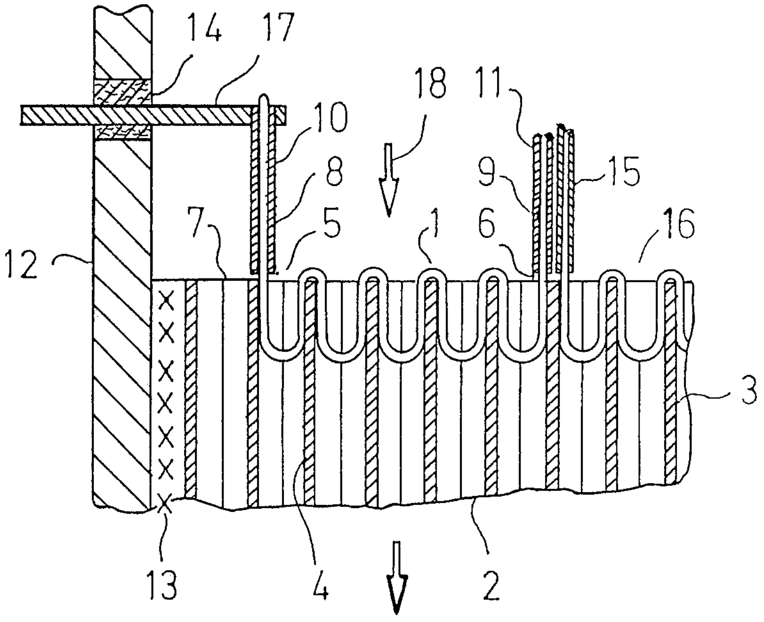
FIG. 1 is a longitudinal cross-sectional view of part of a filter system according to one embodiment of the invention.
Figure 2:
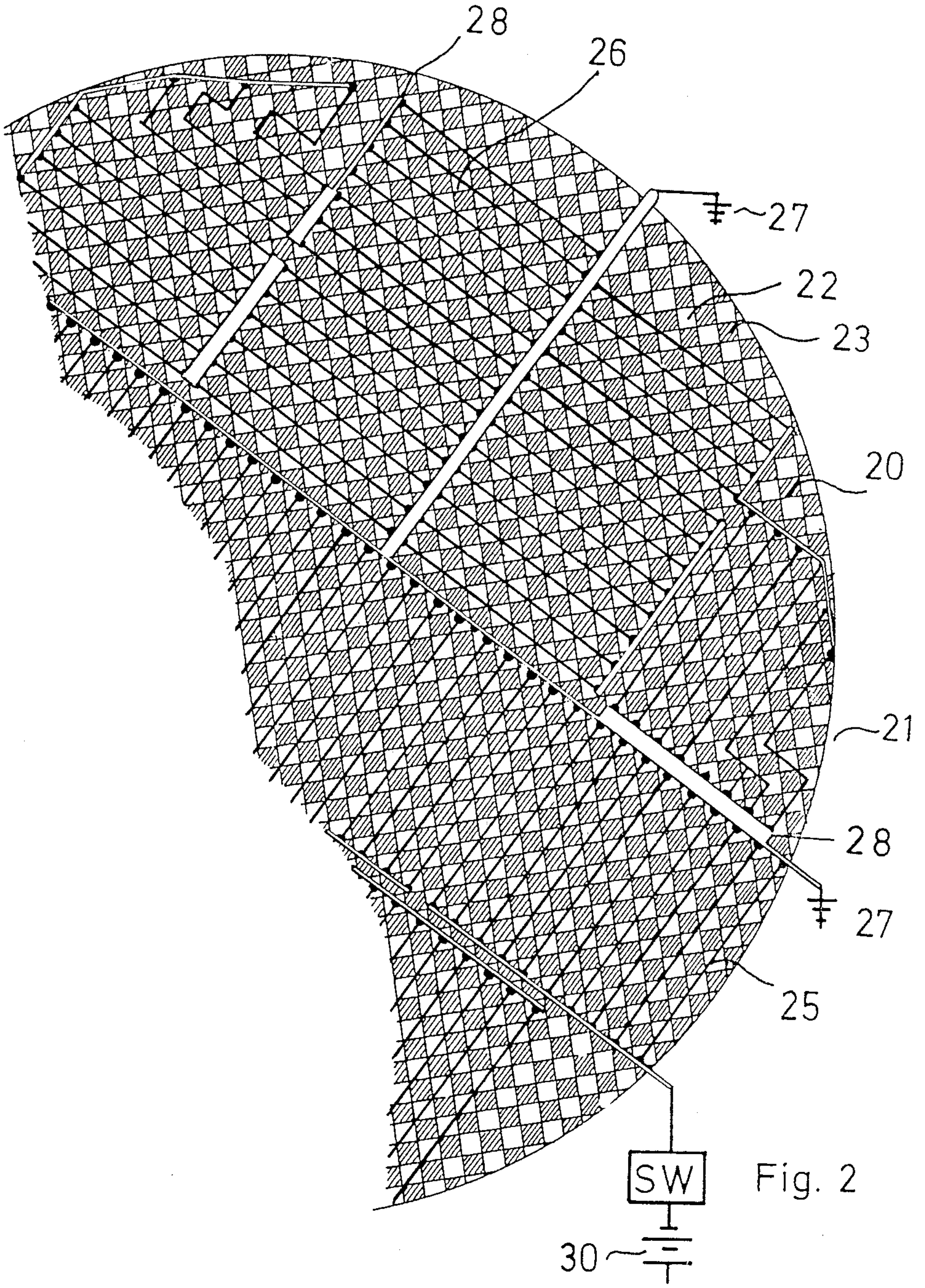
FIG. 2 is a fragmentary plan view of the filter member according to FIG. 1, at a reduced scale.

FIG. 1 shows the housing and attachment of a resistance heating element in a filter system of the earlier-described type. The resistance heating element comprises primarily a bent loop-shaped portion of heating wire 1, whose loops are extended into the intake openings of the filter channels 2 of filter member 3, formed as a honeycomb filter. It is also possible to form the heating wire in such a manner than only the loops 1″ attached in the channels are of electrically conductive material, whereas the bent connections 1′ between the individual conductors are of material of lower electrical resistance. Exhaust gas flows through the filter channels 2 in the direction of the arrow 18. As shown in FIG. 2, the loops of the heating wire are inserted diagonally in the filter channels 2, having a quadratic cross-section, so that a portion of the heating wire, as also shown in FIG. 2, overlaps several adjacent filter channels 2. In order to fix the heating wire 1 permanently in the individual filter channels 2, the wire must be bent in such a manner that it makes contact with the wall 4 of the respective filter channels 2.

The ends 5 and 6 of the heating wire 1 are guided from the intake opening of the respective filter channel and are connected above the face 7 of the filter member 3 by means of connecting elements 8, 9 to a lead-in 17 or a corresponding lead-out (not shown here). Thus the connecting elements are formed such that they fix the ends 5 and 6 of the heating wire in the filter channels. For this purpose it is required that the connecting lines 10 and 11 be of a shape-stable, electrically-conducting material, for example a thin-walled tube. The lead-in 17 and correspondingly also the associated lead-out are guided through the wall of the filter housing 12 in which the filter member 3 is mounted via a packing mat 13. To avoid an electrical contact between the lead-in 17 and the (grounded) filter housing 12, insulation 14, made of a ceramic material, is provided through which the lead-in and the lead-out is inserted. Since the connecting elements 8, 9 are formed of thin walled portions of tubes into which the free ends 5 and 6 of the heatinq wire are inserted and connected, it is also assured that contact with the adjacent connection 15 of a resistance heating element 16, defining another heating area, is avoided.

The length of the heating wire cannot be chosen arbitrarily, but rather is determined by the specific resistance of the material, the cross-section, by the surface output required to attain the ignition temperature, and the available electrical energy. Thus the number of filter channels 2 overlapped by a heating wire element is constant so that, as shown in FIG. 2, the entire face of the filter member is divided with respect to the available electrical output into several separated heating areas.

FIG. 2 shows a fragmentary plan view of the face 20 of ceramic honeycomb filter member 3 with intake channels 22 and filter plugs 23 blocking the filter outlet channels at the inlet side. In the illustrated embodiment a heating wire 25 is looped across intake channels 22. Some eight to ten heating wires 25 may be linked together via a current connector 28 and a ground connector 27 to a heating area 26. The ground line 27 is common to all heating areas 26, whereas the power supply 30 can be switched on individually for each heating area 26. The individual resistance heating elements are formed in such a manner that the face of the filter member 3 is divided into triangular and square, preferably rectangular heating areas. Since the individual heating areas abut one another, all of the inlet channels 22 are connected to a heating element. In the illustrated embodiment such of the heating areas 26 covers with eight to ten heating wires 25 respectively almost all of the filter channels, so that almost the entire filter can be regenerated by a sequential supply of current to the individual heating areas.

In the embodiment illustrated in FIG. 3, the resistance wires 1 are positioned in grooves 51, which are formed perpendicular to the course of direction of the heating wires 1 in the face of the filter. The grooves 51 are sufficiently wide so that the walls of the filter channels 2 are cut and the heating wires 1 can enter into the filter, as shown by FIG. 4. The advantage of disposing the grooves 51 perpendicular to the course of direction of the heating wires 1 is that the mechanical processing of the face of the filter can be carried out primarily in the region of the filter plug. The grooves 51 (see FIG. 4A) are formed sufficiently deeply in the face of the filter that the heating wires 1 do not project above the face. In order to position the heating wires 1 in the grooves 51, a cover plate 52 of heat resistant, gas-permeable, electrically non-conducting material, e.g. ceramic foam, is attached to the face of the filter above the heating wires. The cover plate 52 need not cover the entire face of the filter. It is sufficient if the heating wires 1 are also maintained firmly at some points in the filter material to prevent them from migrating.

Figure 5:
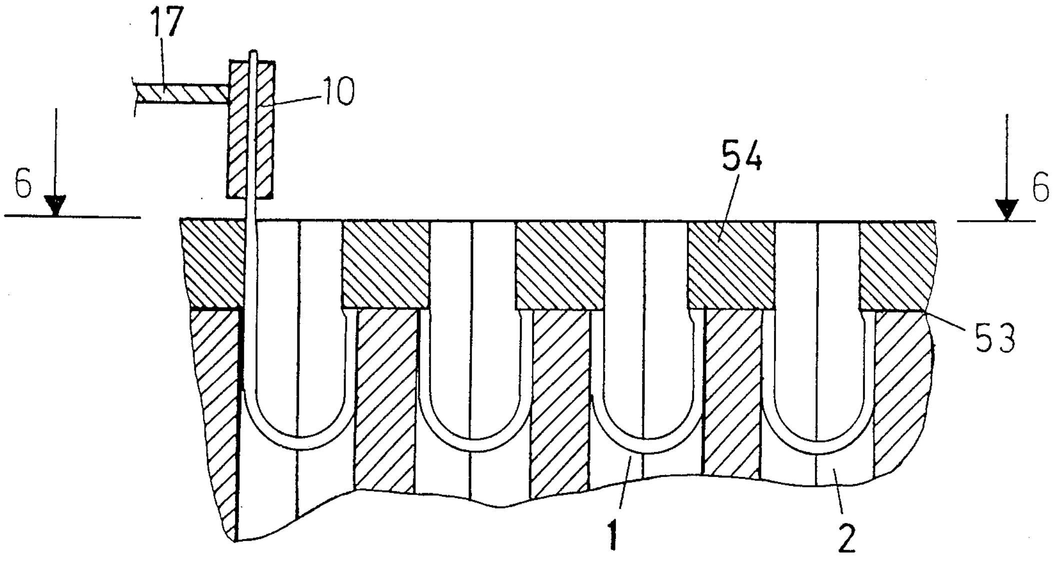
FIG. 5 is a longitudinal cross-sectional view of another embodiment of part of a filter system with grooves in the face of the filter member transverse to the course of direction of the conductors, and including electric guiding rails in the grooves.
Figure 6:
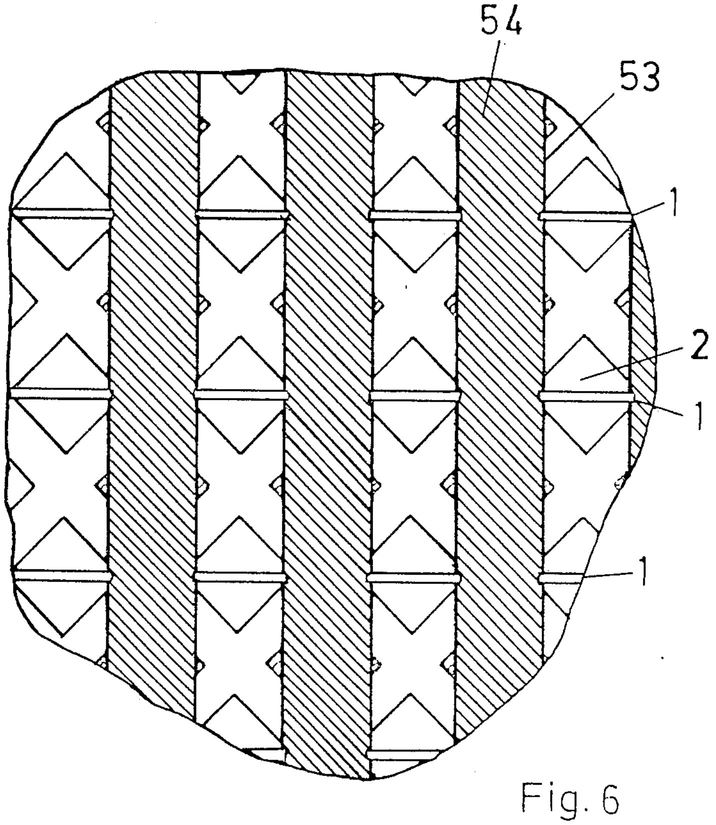
FIG. 6 is a fragmentary plan view of the filter member of the embodiment according to FIG. 5.

In the FIGS. 5, 6 embodiment, loops 1″ may be interconnected by electrically conducting rails 54. The grooves 53 formed in the face of the filter perpendicular to the course of direction of the heating wires can therefore be sealed toward the top with the electrically conducting rails 54, to which the individual heating loops 1″ are attached. A low electrical resistance in the region of transition between the heating loops, where the generated heat is especially low, is especially advantageous here. The conductors in the filter material may be connected to the rails that are fixed in the ceramic material. The rails 54 need not overlap the entire face of the filter. It is sufficient if the conductors 1 are connected to some of the rails at a few points in the filter material to prevent them from shifting.

The corresponding positioning of the conductors 1 on the face of the filter may be effected by the provision of grooves 55, shown in FIG. 7, formed in a cover plate 56 of heat resistant, gas-permeable, electrically non-conducting material, e.g. ceramic foam. The cover plate is attached to the face of the filter above the heating wires. The important advantage in this embodiment lies in the easier construction of the grooves 55, in particular when the cover plate 56 is produced by a pouring process. Then the grooves 55 can be formed when the cover plate 56 is being poured, so that subsequent processing can be omitted.

In the embodiment illustrated in FIGS. 8 and 9, the filter member 3 is provided with alternately, oppositely oriented, sloped, transversely spaced rows of grooves 47 and 48, which are formed in plugs 31 which seal the outlet channels. FIG. 8 shows the first longitudinal cross-section, whereas FIG. 9 is a second longitudinal cross-section, which is transversely displaced in the adjacent row in the face of the filter with respect to FIG. 8. This arrangement has the advantage that the resistance heating wire 1 is housed in grooves 47 and 48 that slope alternately in opposite directions, so that the wire is similarly "hooked in place" and no other positioning is necessary. Also, at least one portion of grooves 47, 48 can be sealed at the top, as exemplified at 49, in the filter channels following the insertion of heating elements 1. Prior to sealing, elements 1 may be enclosed with a material la that incinerates or vaporizes when the heating element is heated so that no short-circuit connection occurs between the heating elements and the filter.

Figure 11:
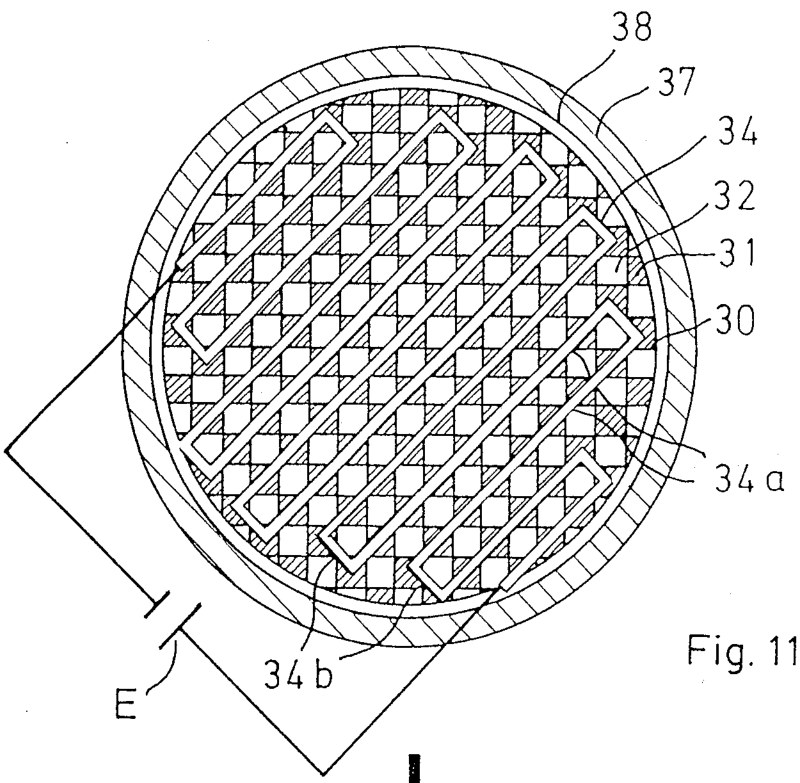
FIG. 11 is a sectional view of a filter member taken substantially along the line 11—11 of FIG. 10.
Figure 10:
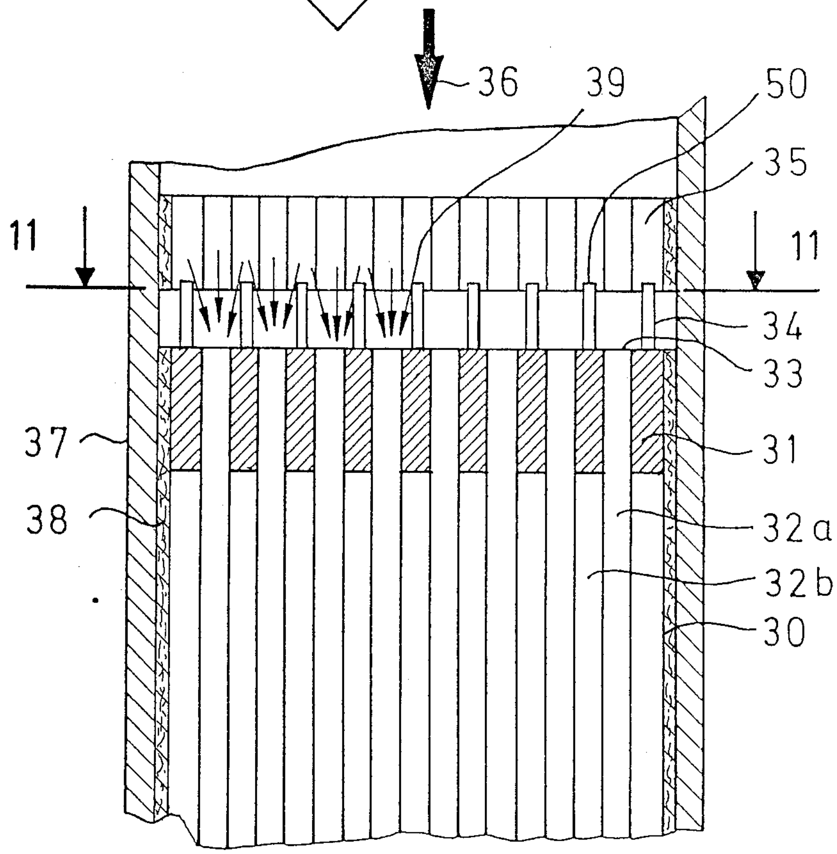
FIG. 10 is a longitudinal cross-sectional view of a filter system according to a still another embodiment of the invention with grooves in the porous cover plate of the filter member.

FIGS. 10 and 11 show another embodiment and arrangement of the resistance heating elements on the filter face. In order to give a better illustration of the arrangement, the filter channels **32*a*, 32*b* have been enlarged. In FIG. 10 and the associated view of the face of FIG. 11**, only one heating area has, therefore, been shown in the diagram.

A heating wire 34, bent in the shape of a square wave and located in the plane of the face 33, is attached across the plugged ends 31 on the face 33 of a honeycomb ceramic filter member. The heating wire has of the filter a plurality of spaced adjacent sections **34*a* interconnected by right angled bent sections 34*b*. In order to attain negligible flow resistance with a large heat-transferring surface, the heating wire 34 has a rectangular cross-section and is attached upright on the face 33. Other cross-sectional shapes for the heating wire, having a large heat transmitting surface, are also possible. For example, resistance heat conductors with heat-transmitting ribs can be considered. It is also possible to arrange several heating wires having round cross-sections one above the other. In order to avoid heat losses of the heating wire 34 to the filter housing 37 and adjacent filter regions, not shown here, due to thermal radiation, a gas-permeable ceramic cover plate 35 is arranged in a grid structure, defining the flow channels, above the heating wire 34. The grid structure absorbs the radiation of the heating wire 34, the radiation being directed against the flow of the exhaust gas, and leads back to the heating area by means of the convective heat transmission with the mass flow of the exhaust gas, shown by arrows 36 and 39. However, the cover plate 35 can also be formed from other material having another structure, for example porous, thus gas-permeable ceramic foam. However, it is essential that the material be able to absorb radiation. The cover plate 35 and the filter member 30 are inserted with a packing mat 38 into the filter housing 37. The cover plate 35 can be designed such that it concomitantly fixes the heating wire 34 mechanically by pressing it to the face 33. In addition to this, the underside of the cover plate 35 facing the heating wire is provided with a wave square shaped groove 50, which determines the precise orientation of the heating wire 34 to the filter member 30**.

In the illustrated configuration, the mass flow of the exhaust gas, shown by arrows 36 and 39, can flow past the heating wire 34 into the filter channels **32*a* with negligible flow resistance. In order to regenerate the filter, the heating wire is connected via a switching device, not shown, to a current source E. Thus the soot in the contact region between the filter member 30 and the heating wire 34 is ignited so that then the particulates, deposited in the filter channels 32*a***, automatically incinerate therein.

Figure 12:
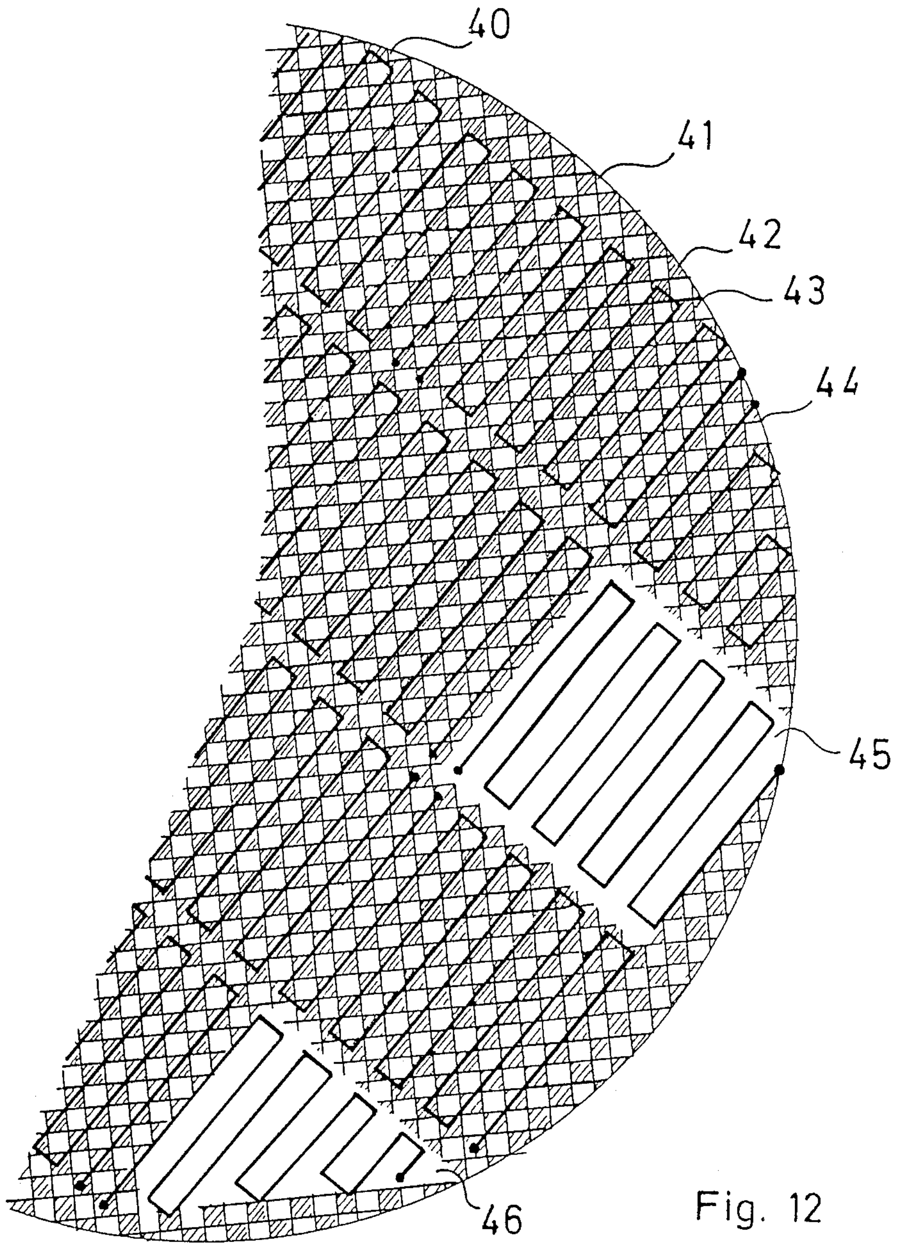
FIG. 12 is a fragmentary plan view of a filter system similar to FIG. 11, divided into several heating areas, with the cover plate removed.

Even in this embodiment it is again necessary that the electrical energy, required to generate the igniting temperature, be adapted to the available electrical output from the lighting system of the vehicle. Correspondingly, as shown in FIG. 12, several different resistance heating elements 40, defining the heating areas, are also attached to the face 41 of a filter member 42. The cover plate 35, shown in FIG. 11, is omitted for clarity. The heating area that is energized by its respective resistance heating element is enlarged in this embodiment due to the larger cross-section of the heating wire and, therefore, encompasses the arrangement of rectangular and triangular heating areas 45 or 46, as shown in FIG. 12. Thus the resistance heating elements are designed in such a manner that the triangular heating areas 46 are half the size of the rectangular heating areas 45 so that two successively switched heating elements, overlapping a triangular heating area 46, has the same electrical resistance as a heating element overlapping a rectangular heating area 45. Even in this arrangement the individual heating elements can be switched on and off individually by means of the switching device, not shown, to the current supply so that the entire filter surface can be regenerated by switching the individual heating elements on and off in succession.

What is claimed is:

1. A filter system for removing particulates from exhaust gases of an internal combustion engine, in particular a diesel engine, comprising at least one filter member in the configuration of a honeycomb of a porous filter material having generally parallel inlet and outlet passages for the gases, particulates for the gases being trapped on some of the surfaces of said inlet passages, said outlet passages being plugged closed at the gas intake side of said filter member, said inlet passages having inlet openings facing said gas intake side and being plugged closed at a side opposite said gas intake side, electric resistance heating means comprising a plurality of spaced apart heating elements each having loop-shaped wire portions extending into several of said inlet openings at said gas intake side for heating and igniting the trapped particulates, said filter member having a plurality of spaced apart grooves in said gas intake side wall thereof receiving connecting portions of said looped shaped wire portions said heating elements for firmly positioning said heating elements directly in said filter member.

2. The system according to claim 1, wherein said heating elements have free ends, connecting elements provided through which said free ends extend for connecting said free ends via a lead-in and a lead-out to an electrical power supply.

3. The system according to claim 2, wherein each said connecting element comprises a tube of electrically conducting material extending parallel to the direction of gas flow against the face of said filter member, one end of said tube being fixedly connecting to one of said lead-in and said lead-out and the other end of said tube being fixedly connected to said free end of said heating element.

4. The system according to claim 1, wherein said heating elements having connections between said loop-shaped portions, said connections being located in said grooves.

5. The system according to claim 4, wherein said connections are attached within said grooves, and said loop-shaped portions are unattached to the walls of said inlet passages.

6. The system according to claim 4 wherein said heating elements extend in a given direction, said grooves extending in a direction perpendicular to said given direction, and said connections between said loops comprising electrically conducting material filling said grooves so that the electrical resistance of said heating elements in the region of said grooves is lower than in the region of said inlet passages.

7. A filter system for removing particulates from exhaust gases of an internal combustion engine, in particular a diesel engine, comprising at least one filter member in the configuration of honeycomb of a porous filter material having generally parallel inlet and outlet passages for the gases, particulates for the gases being trapped on some of the surfaces of said inlet passages, said outlet passages being plugged closed at the gas intake side of said filter member, said inlet passages having inlet openings facing said gas intake side and being plugged closed at a side opposite said gas intake side, electric resistance heating means comprising a plurality of spaced apart heating elements each having loop-shaped wire portions extending into several of said inlet openings at said gas intake side for heating and igniting the trapped particulates, a cover plate of heat resistant, gas-permeable, electrically non-conducting material overlying said heating elements, an underside of said cover plate facing said heating elements having a plurality of spaced grooves for the reception of said heating elements for firmly positioning said heating elements directly in said cover plate.

8. The system according to claim 7, wherein said heating elements have connections between said loop-shaped portions, said connections being located in said grooves.

9. The system according to claim 7, wherein said cover plate is arranged in the direction of flow of the exhaust gas upstream of said heating elements.

10. The system according to claim 7, wherein said cover plate material has a low thermal conductivity.

11. The system according to claim 7, wherein said cover plate has a grid structure defining flow channels.

12. The system according to claim 7, wherein said cover plate material is of a porous, ceramic foam.

13. The system according to claim 7, wherein said heating elements have free ends, connecting element provided through which said free ends extend for connecting said free ends via a lead-in and a lead-out to an electrical power supply.

14. The system according to claim 13, wherein each said connecting element comprises a tube of electrically conducting material extending parallel to the direction of gas flow against the face of said filter member, one end of said tube being fixedly connecting to one of said lead-in and said lead-out and the other end of said tube being fixedly connected to said free end of said heating element.

* * * * *